US012779563B2

(12) United States Patent
Pai

(10) Patent No.: US 12,779,563 B2
(45) Date of Patent: Nov. 3, 2026

(54) DUST COLLECTION STRUCTURE OF BAND SAW MACHINE

(71) Applicant: OAV EQUIPMENT AND TOOLS, INC., Taichung City (TW)

(72) Inventor: Wen-Lung Pai, Taichung City (TW)

(73) Assignee: OAV EQUIPMENT AND TOOLS, INC., Taichung City (TW)

( * ) Notice: Subject to any disclaimer, the term of this patent is extended or adjusted under 35 U.S.C. 154(b) by 137 days.

(21) Appl. No.: 18/786,918

(22) Filed: Jul. 29, 2024

(65) Prior Publication Data

US 2025/0339910 A1 Nov. 6, 2025

(30) Foreign Application Priority Data

May 6, 2024 (TW) ................................ 113116731

(51) Int. Cl.
*B23D 59/00* (2006.01)
*B23D 55/02* (2006.01)
*B23Q 11/00* (2006.01)

(52) U.S. Cl.
CPC ....... *B23D 59/0064* (2024.05); *B23D 55/023* (2013.01); *B23Q 11/0042* (2013.01)

(58) Field of Classification Search
CPC .. B23D 59/0064; B23D 55/023; B23D 59/00; B23D 59/006; B23D 59/0062; B23Q 11/0042; B23Q 11/0046; Y10T 83/2066
See application file for complete search history.

(56) References Cited

U.S. PATENT DOCUMENTS 1,496,035 A * 6/1924 Thomson ........... B23D 59/0062 83/168
1,789,569 A * 1/1931 Tannewitz ......... B23Q 11/0046 29/DIG. 82
1,861,412 A * 5/1932 Oliver ................ B23D 59/0062 83/788
2,664,118 A * 12/1953 Krumbach ............. B23D 55/02 83/810
3,669,163 A * 6/1972 Crane ..................... B27B 13/16 83/788

(Continued)

FOREIGN PATENT DOCUMENTS

AT 7545 U1 * 5/2005 ......... B23Q 11/0046
DE 3446317 A * 9/1986
DE 19951479 A1 * 5/2000 ......... B23Q 11/0046

*Primary Examiner* — Jonathan G Riley
(74) *Attorney, Agent, or Firm* — MUNCY, GEISSLER, OLDS & LOWE, P.C.

(57) ABSTRACT

A dust collection structure of the band saw machine includes a dust collection member and a combining member. The dust collection member has a seat connected to a worktable, a tube connected to the seat and having a tube hole communicating with a seat hole, and a slot provided at the seat and the tube and penetrated by a saw band and communicating with the seat hole and the tube hole. The combining member is used to fix the dust collection member to the worktable through the seat. By directly installing the dust collection member on the worktable, sawdust directly falls into the seat hole and the tube hole to be sucked away. The present invention has a simple structure and convenient and fast installation. This improves dust collection efficiency and solves the known issue of sawdust easily scattering and accumulating on the worktable.

4 Claims, 5 Drawing Sheets

(56) References Cited

U.S. PATENT DOCUMENTS

| | | | | |
|---|---|---|---|---|
| 5,464,286 | A * | 11/1995 | Stevens | E04G 23/08<br>383/41 |
| 8,869,665 | B2 * | 10/2014 | Dammertz | B23D 59/006<br>83/98 |
| 2004/0248507 | A1 * | 12/2004 | Brazell | B24B 55/06<br>451/361 |
| 2006/0053629 | A1 * | 3/2006 | Martin | B23D 59/006<br>30/123 |
| 2009/0181606 | A1 * | 7/2009 | Loveless | B23Q 11/0046<br>451/456 |
| 2009/0183377 | A1 * | 7/2009 | Loveless | B27G 19/04<br>30/390 |
| 2016/0016241 | A1 * | 1/2016 | Taylor | B27B 5/265<br>83/167 |

* cited by examiner

DUST COLLECTION STRUCTURE OF BAND SAW MACHINE

BACKGROUND OF THE INVENTION

1. Field of the Invention

The present invention relates to band saw machines and more particularly, to a dust collection structure of a band saw machine.

2. Description of the Related Art

A traditional dust collection structure of a band saw machine is installed at a distance below the worktable, which causes sawdust to fall out and accumulate on the worktable. A lot of sawdust is not successfully sucked out and the unsucked sawdust needs to be removed separately. As such, there is still room for improvement.

SUMMARY OF THE INVENTION

It is one objective of the present invention to provide a dust collection structure of a band saw machine, which has a simple structure and convenient and fast installation to enhance dust collection efficiency.

To attain the above objective, the dust collection structure of the edge banding machine is installed on a worktable for penetration of a saw band. The dust collection structure comprises a dust collection member and a combining member. The dust collection member includes a seat connected to the worktable and having a seat hole, and a tube connected to the seat and having a tube hole communicating with the seat hole, and a slot provided at the seat and the tube and penetrated by the saw band and communicating with the seat hole and the tube hole. The combining member is used to fix the dust collection member to the worktable through the seat of the dust collection member.

It can be seen from the above that by directly installing the dust collection member on the worktable, sawdust directly falls into the seat hole and the tube hole through the slot to be sucked away, so that the dust collection efficiency can be enhanced and the known issue of sawdust easily scattering and accumulating on the worktable can be solved, thereby achieving the purpose of simple structure and convenient and fast installation.

Preferably, the seat and the tube are integrally formed.

Preferably, the seat has a fixing portion fixed to the worktable and a connecting portion connected to the tube. The seat hole passes through the fixing portion and the connecting portion.

Preferably, the connecting portion is flexibly deformed.

Preferably, the combining member can be a magnetic member, hook and loop fastener or bolt.

Preferably, the connecting member is installed in an installation hole of the seat.

Preferably, the seat has a through hole communicating with the installation hole.

Preferably, the dust collection member has an opening passing through the fixing portion and communicating with the seat hole.

Other advantages and features of the present invention will be fully understood by reference to the following specification in conjunction with the accompanying drawings, in which like reference signs denote like components of structure.

DETAILED DESCRIPTION OF THE INVENTION

Figure 1:
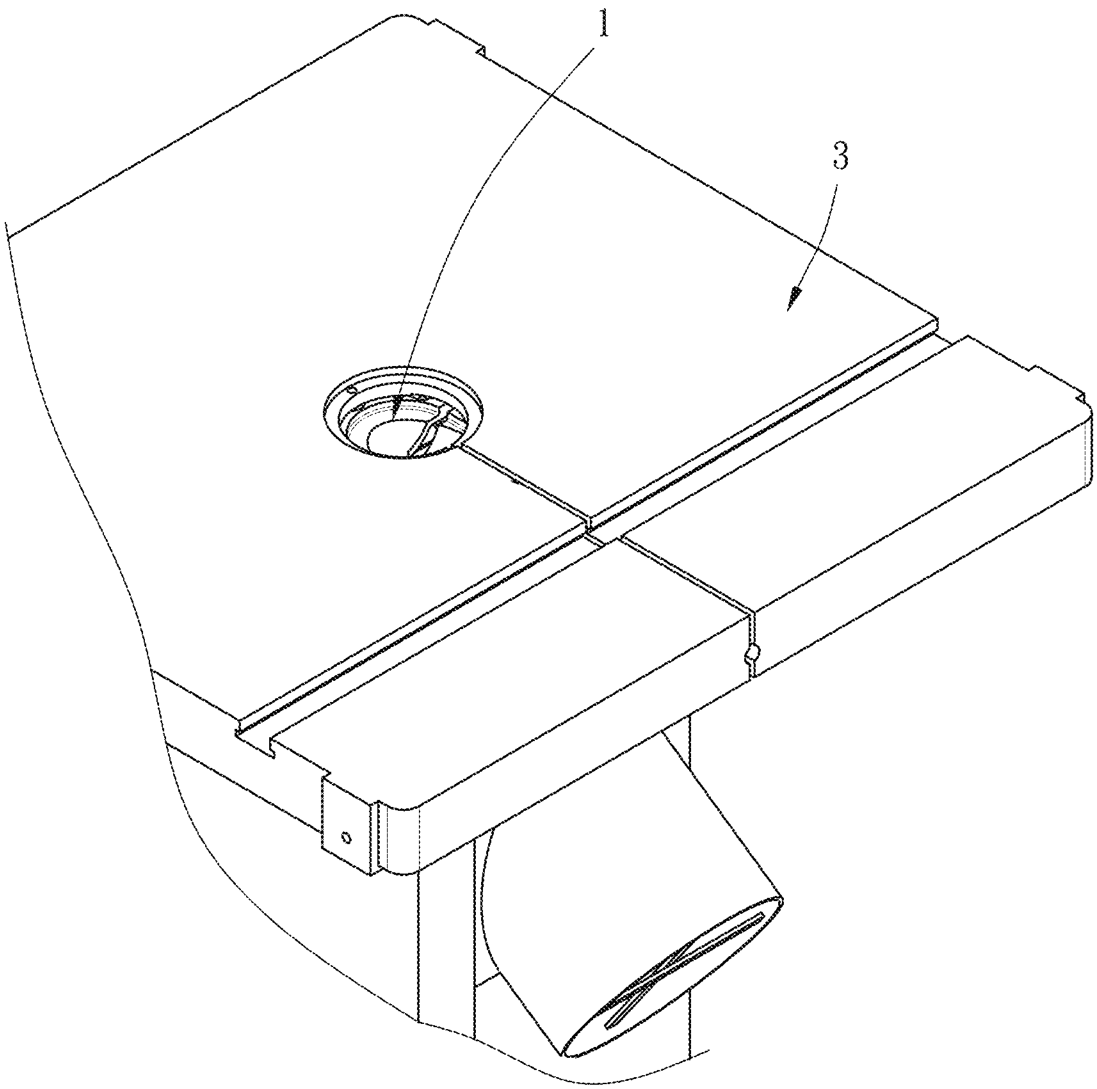
FIG. 1 is a top perspective view of a dust collection structure of the present invention, in which the dust collection structure is installed on the worktable.
Figure 2:
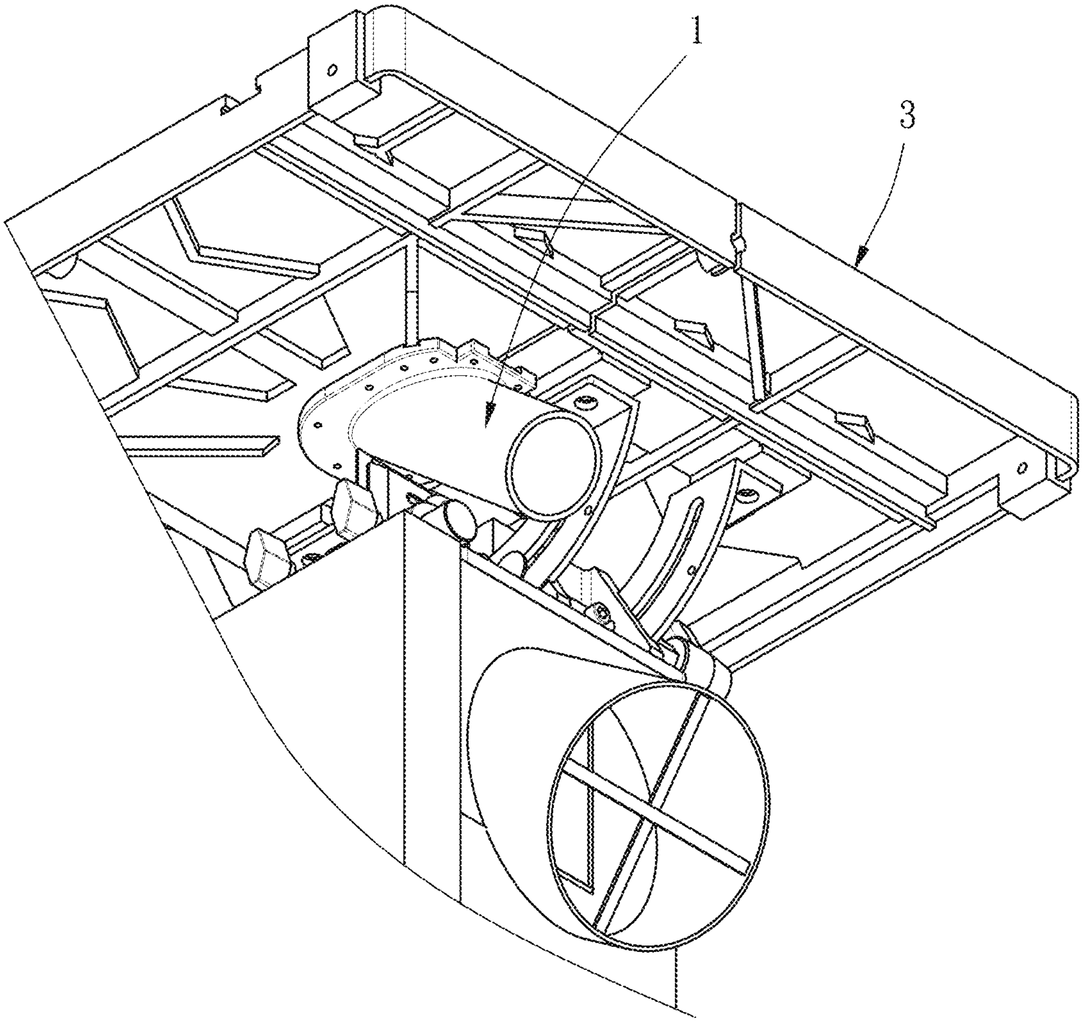
FIG. 2 is a bottom perspective view of the dust collection structure of the present invention, in which the dust collection structure is installed on the worktable.
Figure 3:
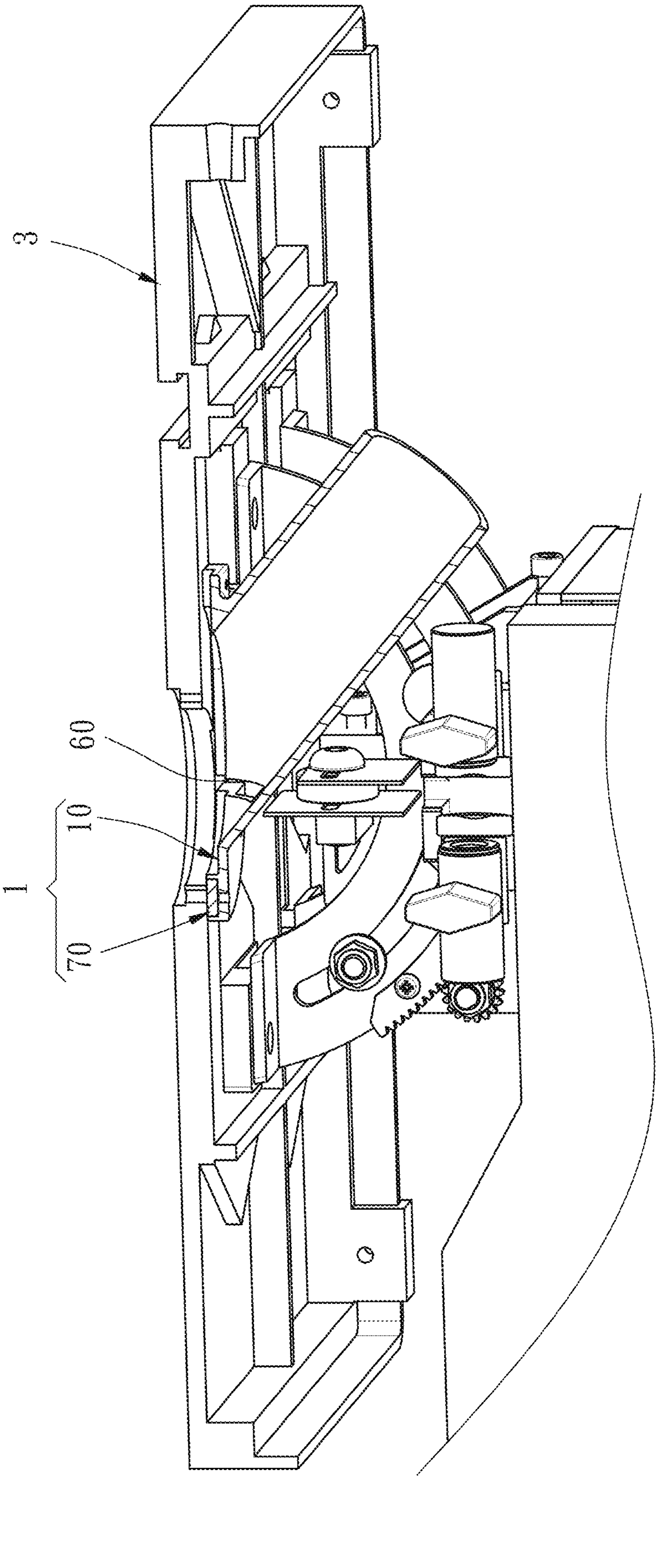
FIG. 3 is a sectional view of the dust collection structure of the present invention, in which the dust collection structure is installed on the worktable.
Figure 4:
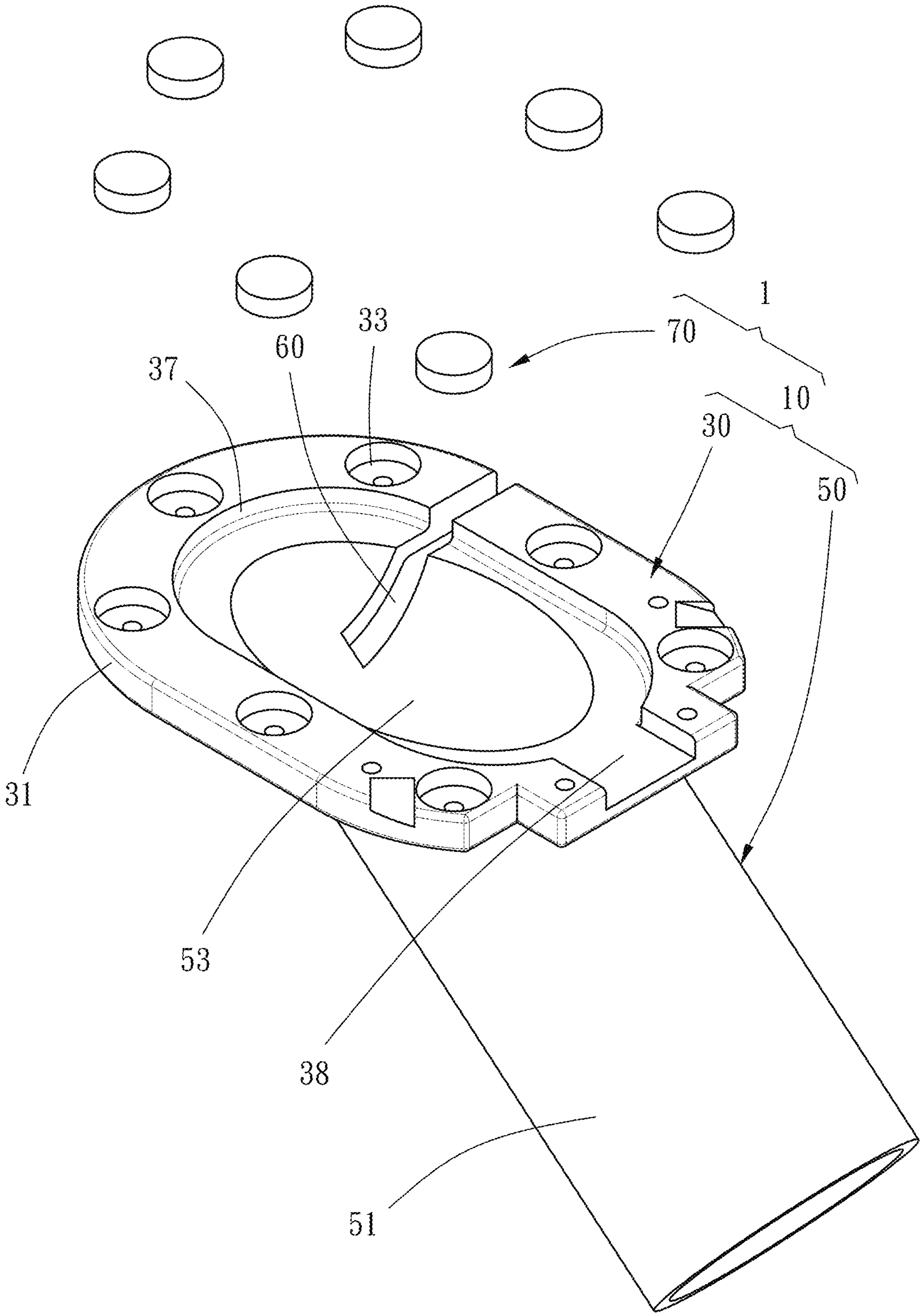
FIG. 4 is a top exploded view of the dust collection structure of the present invention.
Figure 5:
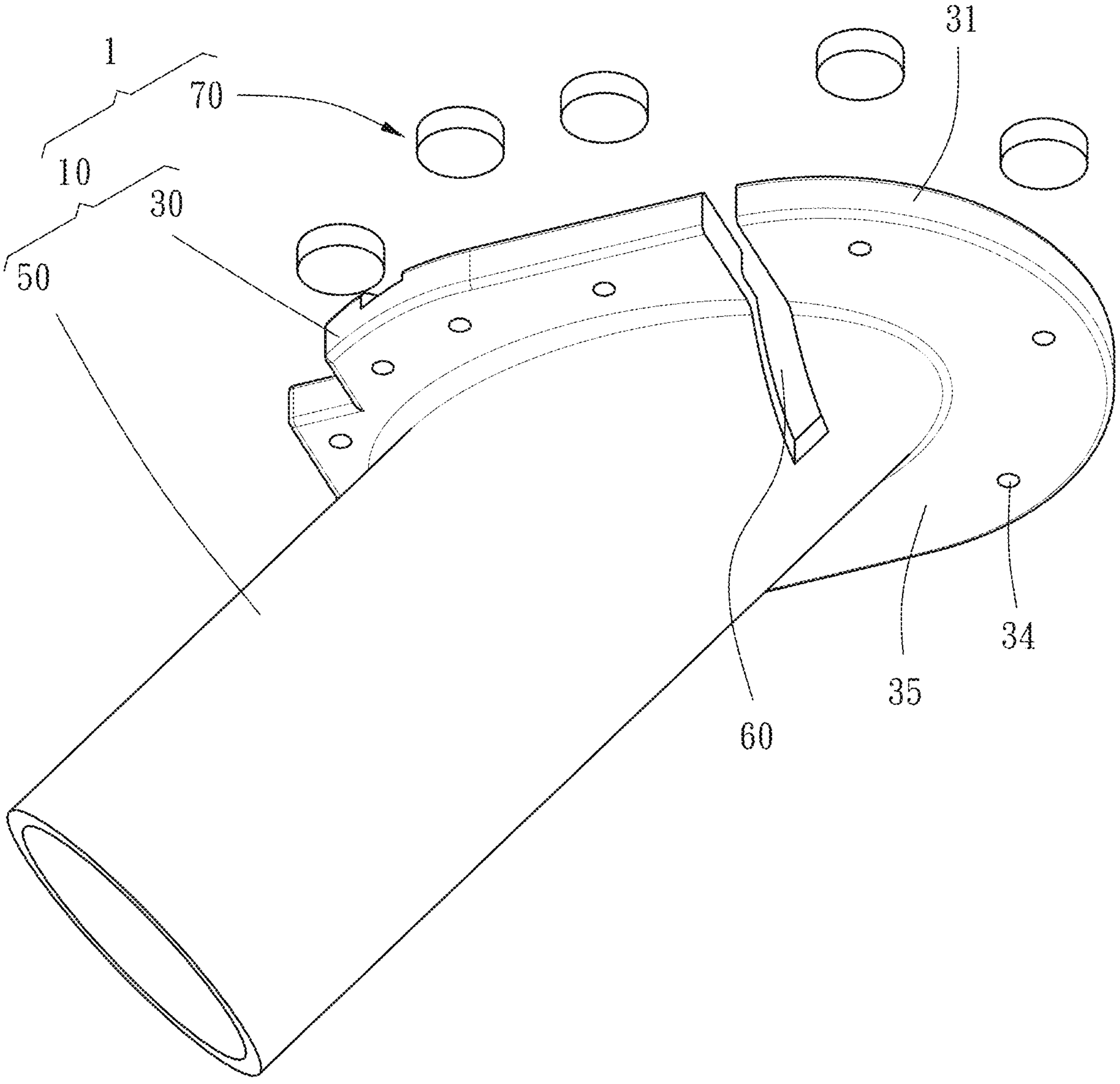
FIG. 5 is a bottom exploded view of the dust collection structure of the present invention.

As shown in FIGS. 1-5, a dust collection structure 1 of the present invention is installed on a worktable 3 and penetrated by a saw band (not shown), comprising a dust collection member 10 and a plurality of combining members 70.

The dust collection member 10 includes a seat 30, a tube 50, and a slot 60.

The seat 30 has a fixing portion 31 abutted against the workpiece 3, a plurality of installation holes 33 provided at the fixing portion 31, a plurality of through holes 34 respectively communicating with the installation holes 33, a connecting portion 35 connected with the bottom of the fixing portion 31, a seat hole 37 passing through the fixing portion 31 and the connecting portion 35, and an opening 38 passing through the fixing portion 31 and communicating with the seat hole 37.

The tube 50 is connected with the seat 30. In this embodiment, the seat 30 and the tube 50 are integrally formed. The tube 50 includes a tube body 51 connected with the connecting portion 35 of the seat 30, and a tube hole 53 communicating with the seat hole 37 of the seat 30. The tube 50 is connected to a dust collecting machine (not shown) through a dust collection pipe (not shown).

The slot 60 is provided at the fixing portion 31 and the connecting portion 35 of the seat 30 and the tube body 51 of the tube 50. In more detail, the slot 60 communicates with the seat hole 37 of the seat 30 and the tube hole 53 of the tube 50.

The combining members 70 are used to fix the dust collection member 10 to the worktable 3. In this embodiment, each of the combining members 70 is a magnetic member, and the worktable 3 is made of magnetic metal material. The combining members 70 are fixed in the installation holes 33 of the seat 30.

In accordance with the aforementioned structure, the dust collection member 10 is quickly and firmly installed on the worktable 3 through the combining members 70, and the slot 60 of the dust collection member 10 is fitted to the saw band, so that the sawdust is not easy to fall out, and will directly fall into the seat hole 37 and the tube hole 53 to be directly sucked out for dust collection. Therefore, the dust collection structure 1 of the present invention can achieve the purpose of simple structure, convenient and fast installation, and enhancing dust collection efficiency.

In addition to the above embodiment, the present invention can also be implemented as follows:

For example, the combining member 70 is not limited to the aforesaid magnetic member, but may also be other combining members, such as a bolt or hook and loop fastener. Alternatively, the connecting portion 35 of the seat 30 can also be flexibly deformed so as to be bent for various uses. Alternatively, the combining member 70 is not limited to multiple in number, and it can be single one in number to achieve the combining effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dust collection structure of a band saw machine for installation on a worktable and for a saw band to pass through, the dust collection structure comprising:

a dust collection member including a seat for connecting to the worktable, a tube connected to the seat, and a slot provided at the seat and the tube for the saw band to pass through, the seat having a seat hole, the tube having a tube hole communicating with the seat hole of the seat, the slot communicating with the seat hole of the seat and the tube hole of the tube; and a combining member configured to fix the dust collection member to the worktable through the seat of the dust collection member;

wherein the combining member is a magnetic member;

wherein the combining member is installed in an installation hole of the seat;

wherein the seat has a through hole communicating with the installation hole.

2. The dust collection structure of the band saw machine as claimed in claim 1, wherein the seat and the tube are integrally formed.

3. The dust collection structure of the band saw machine as claimed in claim 1, wherein the seat has a fixing portion for fixing to the worktable and a connecting portion connected to the tube; the seat hole passes through the fixing portion and the connecting portion.

4. The dust collection structure of the band saw machine as claimed in claim 1, wherein the dust collection member has an opening passing through the fixing portion and communicating with the seat hole.

* * * * *